United States Patent [19]

Uehlinger

[11] Patent Number: 4,466,920
[45] Date of Patent: Aug. 21, 1984

[54] DISAZO COMPOUNDS HAVING A FURTHER UNSUBSTITUTED OR SUBSTITUTED SULFOPHENYL DIAZO COMPONENT RADICAL AND A 4-ALKOXY- OR ARYLSULFONYLOXY-BENZENE COUPLING COMPONENT RADICAL HAVING AN ACYLAMINO SUBSTITUENT

[75] Inventor: Hanspeter Uehlinger, Basel, Switzerland

[73] Assignee: Sandoz Ltd., Basel, Switzerland

[21] Appl. No.: 74,952

[22] Filed: Sep. 13, 1979

Related U.S. Application Data

[63] Continuation-in-part of Ser. No. 884,412, Mar. 8, 1978, abandoned.

[30] Foreign Application Priority Data

Mar. 14, 1977 [CH] Switzerland .................. 3157/77
Jul. 11, 1979 [CH] Switzerland .................. 6478/79

[51] Int. Cl.³ ............... C09B 31/078; C09B 31/08; D06P 3/24; D06P 3/32
[52] U.S. Cl. .................. 260/187; 260/196; 260/205; 260/206; 260/207; 260/207.1
[58] Field of Search ............................ 260/187

[56] References Cited

U.S. PATENT DOCUMENTS

| | | | |
|---|---|---|---|
| 3,485,814 | 12/1969 | Speck | 260/186 |
| 3,594,363 | 7/1971 | Stingl | 260/186 |
| 3,676,050 | 7/1972 | James | 8/41 B |
| 3,862,119 | 1/1975 | Stingl | 260/186 |
| 3,904,596 | 9/1975 | Blackwell et al. | 260/187 |
| 3,960,831 | 6/1976 | Nickel et al. | 260/186 |
| 4,049,641 | 9/1977 | Studer | 260/191 |

FOREIGN PATENT DOCUMENTS

| | | | |
|---|---|---|---|
| 1794389 | 1/1974 | Fed. Rep. of Germany | 260/186 |
| 2460466 | 1/1976 | Fed. Rep. of Germany | 260/187 |
| 502309 | 3/1939 | United Kingdom | 260/186 |
| 1062255 | 3/1967 | United Kingdom | 260/187 |
| 1374048 | 11/1974 | United Kingdom | 260/186 |

OTHER PUBLICATIONS

Woroshzoco, "Grundlagen der Sythese von Zwischenproducten und Farestoffen", pp. 649–652, (1966).

Primary Examiner—Floyd D. Higel
Attorney, Agent, or Firm—Gerald D. Sharkin; Richard E. Vila; Melvyn M. Kassenoff

[57] ABSTRACT

Disazo compounds of the formula

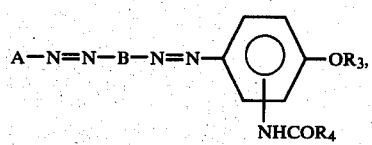

in which
A is a diazo component radical,
B is a coupling/diazo component radical of the 1,4-phenylene, 1,4-naphthylene or 5,6,7,8-tetrahydro-1,4-naphthylene series,
$R_3$ is hydrogen (C$_{1-4}$)alkyl or

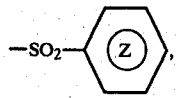

wherein ring Z is unsubstituted or monosubstituted by halo, (C$_{1-4}$)alkyl or (C$_{1-4}$)alkoxy, and
$R_4$ is (C$_{1-6}$)alkyl, (C$_{1-6}$)alkoxy, amino mono(C$_{1-6}$)alkylamino or di(C$_{1-6}$) alkylamino, with the proviso that the compound contains a single sulpho group on the diazo component radical A and no other water-solubilizing group, which compound is in free acid or salt form, and mixtures of such compounds which are useful as anionic dyestuffs for dyeing and printing substrates such as natural and synthetic polyamides (e.g., wool, silk and nylon), leather, polyurethanes and polyolefins modified to contain basic groups. The dyes may be used as such or in the form of liquid (e.g., concentrated aqueous) or solid preparations.

16 Claims, No Drawings

DISAZO COMPOUNDS HAVING A FURTHER UNSUBSTITUTED OR SUBSTITUTED SULFOPHENYL DIAZO COMPONENT RADICAL AND A 4-ALKOXY- OR ARYLSULFONYLOXY-BENZENE COUPLING COMPONENT RADICAL HAVING AN ACYLAMINO SUBSTITUENT

This application is a continuation-in-part of application Ser. No. 884,412, filed Mar. 8, 1978 and now abandoned.

The present invention relates to anionic disazo compounds, their preparation and use as anionic dyes.

More particularly, the present invention provides compounds of formula I,

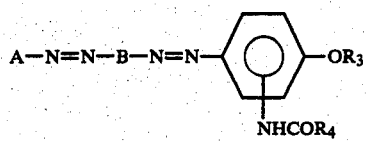

in which

A is a diazo component radical,

B is a coupling/diazo component radical of the 1,4-phenylene, 1,4-naphthylene or 5,6,7,8-tetrahydro-1,4-naphthylene series, $R_3$ is hydrogen, $(C_{1-4})$alkyl or

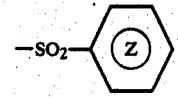

wherein ring Z is unsubstituted or monosubstituted by halogen, $(C_{1-4})$alkyl or $(C_{1-4})$alkoxy ($R_3$ is preferably other than hydrogen) and $R_4$ is $(C_{1-6})$alkyl, $(C_{1-6})$alkoxy, amino, mono$(C_{1-6})$alkylamino or di$(C_{1-6})$alkylamino, with the proviso that the compounds contain a single water-solubilizing group, which group is a sulpho group and is present on the diazo component radical A, which compounds are in free acid or salt form, and mixtures of compounds of formula I.

Preferably, the diazo component radical A is a diazo component radical of the benzene series.

Preferred compounds of formula I are those of formula Ia,

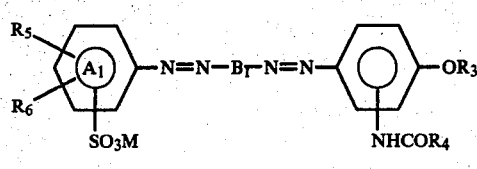

in which $B_1$ is a radical of formula (a), (b) or (c)

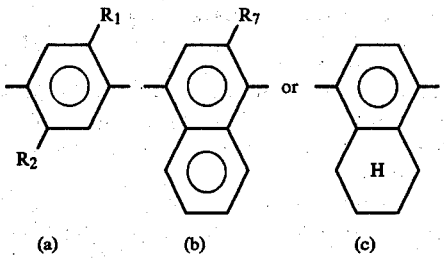

wherein each of $R_1$ and $R_2$, independently, is hydrogen, $(C_{1-4})$alkyl, $(C_{1-4})$alkoxy or monohalogen-substituted$(C_{1-4})$alkyl, $R_5$ is hydrogen, halogen, $(C_{1-4})$alkyl, monohalogen-substituted$(C_{1-4})$alkyl, $(C_{1-4})$alkoxy, mono$(C_{1-6})$alkylamino, di$(C_{1-6})$alkylamino, alkyl$(C_{1-6})$carbonylamino or alkoxy$(C_{1-6})$carbonylamino, $R_6$ is hydrogen, halogen, $(C_{1-4})$alkyl or $(C_{1-4})$alkoxy, $R_7$ is hydrogen or methoxy, M is hydrogen or an equivalent of a nonchromophoric cation, and $R_3$ and $R_4$ are as defined above.

By halogen as used herein is meant fluorine, chlorine or bromine.

Any halogen as $R_5$ and/or $R_6$ is preferably chlorine or bromine, with chlorine being especially preferred.

Any halogen-substituted alkyl as $R_5$ is preferably a fluorosubstituted or chlorosubstituted alkyl, with chlorosubstituted alkyl being especially preferred. Any unsubstituted or substituted alkyl as $R_5$ preferably contains 1 or 2 carbon atoms, more preferably 1 carbon atom. Preferably, any alkyl as $R_5$ is unsubstituted.

Any alkyl as $R_6$ is preferably methyl or ethyl, with methyl being most preferred. Any alkoxy as $R_5$ and/or $R_6$ is peferably methoxy or ethoxy. Any monoalkylamino group as $R_5$ is preferably methylamino or ethylamino, more preferably methylamino. Any dialkylamino as $R_5$ preferably contains methyl and/or ethyl groups, more preferably methyl groups. The most preferred alkyl$(C_{1-6})$carbonylamino as $R_5$ is acetylamino. Any alkoxy$(C_{1-6})$carbonylamino as $R_5$ is preferably methoxy- or ethoxy-carbonylamino.

$R_5$ is preferably $R_5'$, where $R_5'$ is hydrogen, halogen, $(C_{1-4})$alkyl, $(C_{1-4})$alkoxy or acetylamino. More preferably, $R_5$ is $R_5''$, where $R_5''$ is hydrogen, chlorine, $(C_{1-2})$alkyl, $(C_{1-2})$alkoxy or acetylamino. Even more preferably, $R_5$ is $R_5'''$, where $R_5'''$ is hydrogen, chlorine, methyl, methoxy or acetylamino, with hydrogen being most preferred.

$R_6$ is preferably $R_6'$, where $R_6'$ is hydrogen, halogen, $(C_{1-2})$alkyl or $(C_{1-2})$alkoxy. More preferably, $R_6$ is $R_6''$, where $R_6''$ is hydrogen, chlorine or methyl, with hydrogen being especially preferred. Preferably, when $R_5$, $R_5'$, $R_5''$ or $R_5'''$ signifies acetylamino, $R_6$ is hydrogen.

When $R_5$ and $R_6$ are both hydrogen, the sulpho group on ring $A_1$ is preferably in the 3- or 4-position. When one of $R_5$ and $R_6$ is hydrogen and the other is other than hydrogen, the two substituents on ring $A_1$ are preferably in the 2,4-, 2,5- or 3,4-positions, more preferably in the 2,4- or 2,5-positions, with the sulpho group preferably being in the 2-position when the other substituent is acetylamino. When both of $R_5$ and $R_6$ are other than hydrogen, the three substituents on ring $A_1$ are preferably in the 2,3,5-, 2,4,5- or 2,4,6-positions, with the 2,4,5- and 2,4,6-positions being more preferred and the sulpho group preferably being ortho or para to the azo group, especially methyl, ethyl, phenylsulphonyl or tosyl.

Any halogen-substituted alkyl as $R_1$ and/or $R_2$ is preferably a chlorosubstituted alkyl. Any unsubstituted alkyl or alkoxy or substituted alkyl as $R_1$ and/or $R_2$ preferably contains 1 or 2 carbon atoms, more preferably 1 carbon atom. Preferably any alkyl as $R_1$ and/or $R_2$ is unsubstituted.

$R_1$ is preferably $R_1'$, where $R_1'$ is hydrogen, methyl or methoxy; with methoxy being especially preferred.

$R_2$ is preferably $R_2'$, where $R_2'$ is hydrogen, methyl or methoxy. More preferably, $R_2$ is $R_2''$, where $R_2''$ is methyl or methoxy.

$R_7$ is preferably hydrogen.

B or $B_1$ is preferably a radical of formula (a) or (b), in which latter radical $R_7$ is, as indicated above, preferably hydrogen. More preferably, $B_1$ is a radical of formula (a).

Any alkyl radical as $R_3$ is preferably methyl or ethyl. When $R_3$ is

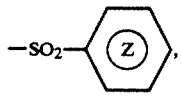

any halogen on ring Z is preferably chlorine; any alkyl on ring Z is preferably methyl or ethyl (especially methyl); and any alkoxy on ring Z is preferably methoxy or ethoxy.

$R_3$ is preferably $R_3'$, where $R_3'$ is hydrogen, methyl, ethyl, phenylsulphonyl or tosyl. More preferably, $R_3$ is $R_3''$, where $R_3''$ is methyl or ethyl.

Any alkyl group as $R_4$ or as a substituent on an amino group as $R_4$ preferably contains 1 to 4 carbon atoms, more preferably 1 or 2 carbon atoms, with methyl being most preferred. Any alkoxy as $R_4$ preferably contains 1 to 4 carbon atoms, with methoxy and ethoxy being most preferred.

Preferably, $R_4$ is $R_4'$, where $R_4'$ is $(C_{1-4})$alkyl, $(C_{1-4})$alkoxy or unsubstituted amino. More preferably, $R_4$ is $R_4''$, where $R_4''$ is methyl, ethyl, methoxy, ethoxy or amino. Even more preferably, $R_4$ is $R_4'''$, where $R_4'''$ is methyl, methoxy, ethoxy or amino. Most preferably, $R_4$ is $R_4^{iv}$, where $R_4^{iv}$ is methyl or amino, especially methyl.

The cation of the sulpho group in the compounds of formula I and the non-chromophoric cation M of the compounds of formula Ia may be any conventional cation for anionic dyestuffs. Examples of such cations are alkali metal cations such as sodium, lithium and potassium, and unsubstituted and substituted ammonium cations of the formula $N^{\oplus}(R_9)_4$, where each $R_9$, independently, is hydrogen, $(C_{1-4})$alkyl or 2-, 3- or 4-hydroxy$(C_{2-4})$alkyl, with the proviso that at least one $R_9$ is other than hydroxyalkyl. Examples of such ammonium cations are ammonium, mono-, di-, tri- and tetramethylammonium, triethylammonium and mono-, di- and tri-ethanolammonium.

Further preferred compounds according to the invention are those of formula Ia wherein (i) $B_1$ is a radical of formula (a) or (b), $R_5$ is $R_5'$, $R_6$ is $R_6'$, $R_7$ is hydrogen, $R_1$ is $R_1'$ and $R_2$ is $R_2'$, especially those where the sulpho group on ring $A_1$ and any substituents as $R_5'$ and/or $R_6'$ are in the above-indicated preferred positions.

(ii) $B_1$ is a radical of formula (a) and all other variables are as given under (i).

(iii) $B_1$ is a radical of formula (a), $R_5$ is $R_5'$, $R_6$ is $R_6'$, $R_1$ is $R_1'$, $R_2$ is $R_2'$, $R_3$ is $R_3'$ and $R_4$ is $R_4'$, especially those where the sulpho group on ring $A_1$ and any substituents as $R_5'$ and/or $R_6'$ are in the above-indicated preferred positions.

(iv) $B_1$ is a radical of formula (a), $R_5$ is $R_5''$, $R_6$ is $R_6''$, with the proviso that when $R_5''$ is acetylamino, $R_6''$ is hydrogen, $R_1$ is methoxy, $R_2$ is $R_2'$, $R_3$ is $R_3'$ and $R_4$ is $R_4''$, especially those where the sulpho group on ring $A_1$ and any substituents as $R_5''$ and/or $R_6''$ are in the above-indicated preferred positions.

(v) $B_1$ is a radical of formula (a), $R_5$ is $R_5'''$, $R_6$ is $R_6''$, with the proviso that when $R_5'''$ is acetylamino, $R_6''$ is hydrogen, $R_1$ is methoxy, $R_2$ is $R_2''$, $R_3$ is $R_3'$ and $R_4$ is $R_4''$, especially those where the sulpho group on ring $A_1$ and any substituents as $R_5'''$ and/or $R_6''$ are in the above-indicated preferred positions.

(vi) All variables are as defined in (v) with the exception that $R_3$ is $R_3''$.

(vii) All variables are as defined in (v) with the exception that $R_3$ is $R_3''$ and $R_4$ is $R_4'''$.

(viii) All variables are as defined in (v) with the exception that $R_3$ is $R_3''$ and $R_4$ is $R_4^{iv}$.

(ix) All variables are as defined in (v) with the exception that $R_3$ is $R_3''$, $R_4$ is methyl and both of $R_5$ and $R_6$ are hydrogen.

The present invention also provides a process for the production of compounds of formula I and mixtures thereof comprising (a) coupling the diazotized amine of formula II,

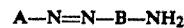

or a mixture thereof, with a phenol of formula III,

or a mixture thereof, under alkaline conditions, to produce a compound of formula Ix,

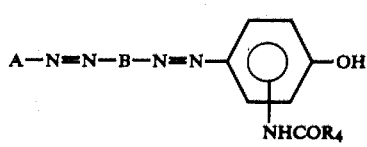

or a mixture thereof, (b) etherifying or acylating a compound of formula Ix, or a mixture thereof, to form a compound of formula I wherein $R_3$ is other than hydrogen.

The coupling reaction in process variant (a) may be effected in accordance with known methods. Diazotization to produce the starting materials thereof may also be carried out in conventional manner.

The etherification or acylation of process variant (b) may be effected in known manner. Suitably, the etherification is carried out employing the corresponding dialkylsulphate. The reaction is suitably carried out in aqueous alkaline medium, the preferred pH being from 9 to 10. The reaction temperature is suitably from 30° to 90° C., more preferably from 60° to 80° C.

Acylation is suitably effected employing the corresponding sulphonylchloride. The reaction mixture is suitably aqueous which is made alkaline with soda, the preferred pH being from 8 to 10. The reaction temperature is suitably between 30° and 90° C., preferably between 60° and 70° C.

The compounds of formula I obtained may be isolated in accordance with conventional methods.

In general, as a result of the reaction conditions, compounds of formula I are obtained which are in salt form, which compounds may be converted into free acid form by known methods.

The compounds of formulae II and III are either known or may be prepared in accordance with known methods from readily available starting materials; for example, compounds of formula II may be obtained by coupling the diazonium compound of an amine A—$NH_2$, in acid medium, to an amine B—$NH_2$.

The compounds of formula I and mixtures thereof are useful for dyeing or printing anionic dyeable substrates. Suitable substrates include natural and synthetic polyamides, leather and basic-modified polyolefins and polyurethanes. Especially suitable are textile substrates consisting of or comprising natural and synthetic polyamides, such as wool and silk, and particularly nylon. The dyestuffs may advantageously be used for carpet printing.

The compounds of formula I, and mixtures thereof, may be employed as such or may be used in the form of liquid or solid preparations. The preparation of stable liquid, for example concentrated aqueous preparations, and solid preparations may be carried out in accordance with conventional methods, for example by dissolving in suitable solvents, optionally with the addition of conventional additives such as solubilizing agents, for example urea, or by grinding or granulating. Such preparations may be obtained in accordance with the procedure described in French Pat. Nos. 1,572,030 and 1,581,900.

Further, the compounds of formula I, and mixtures thereof, may be made up into preparations which are dispersible in cold water. Such dispersions may be prepared, for example, by grinding the dye wet or dry in the presence of one or more conventional anionic dispersing agents and optionally in the presence of other conventional additives, with subsequent spray-drying. The preparations so obtained are finely dispersed in cold water and are thus easy to handle.

Dyeing may be carried out in accordance with known methods, for example pad dyeing or exhaust dyeing, especially the latter as the compounds of formula I and mixtures thereof build-up from a neutral dyebath. Furthermore, the compounds of formula I and mixtures thereof are also useful for use in the "space-dyeing" process.

The compounds of formula I and mixtures thereof are well soluble in water, build-up well, migrate well and give even dyeings, especially on stripy nylon. The dyeings obtained possess notable light-fastness. Furthermore, the compounds of formula I and their mixtures give dyeings which have notable general fastness, such as wet-fastness, especially wash-, water-, milling- and sweat-fastness.

The compounds of formula I and mixtures thereof are suitable for combining with other dyes having neutral build-up, whereby dyeings having the above-mentioned advantageous properties are obtained. Further, such dyeings do not exhibit catalytic fading.

The following Examples further serve to illustrate the invention. In the Examples, all parts are by weight and all degrees are in degrees Centigrade.

EXAMPLE 1

33.7 Parts of the azo dye obtained by diazotizing 1-aminobenzene-4-sulphonic acid followed by coupling under acid conditions with 1-amino-2,5-dimethoxybenzene are dissolved with heating in 200 parts water and 12.5 parts of an approximately 25% ammonia solution and are then mixed with 6.9 parts sodium nitrite dissolved in 25 parts water. The nitrite-containing aminoazo dyestuff solution is added dropwise, over the period of 30 minutes, to a reaction vessel containing 28 parts of 30% hydrochloric acid, 40 parts water and 50 parts ice. After stirring for 1 hour, 2.76 parts sodium nitrite dissolved in 10 parts water and 11.5 parts 30% hydrochloric acid are added thereto and the solution is stirred for 18 hours, after which time diazotization is complete.

15.1 Parts 3-acetylamino-1-hydroxybenzene are stirred in 100 parts water with 1 part sodium carbonate at a pH of 9.5. The diazonium solution obtained as described above is added dropwise thereto from a compression pump over the period of 30 minutes, the pH of the solution being maintained at 9.5 by the addition of 27 parts sodium carbonate. After a further 15 minutes the coupling is complete. The precipitated dyestuff is isolated by filtering. The filtercake is dissolved at 80° (pH 9.5) with water to a volume of 750 parts by volume and mixed over a period of 30 minutes with 120 parts diethylsulphate, During the 30 minutes the pH is maintained at 9.5 by the dropwise addition of a 30% sodium hydroxide solution and the temperature is held at 80°, after which time the etherification is complete. The precipitated dyestuff which is isolated by filtration followed by drying is a brown powder and corresponds to the formula

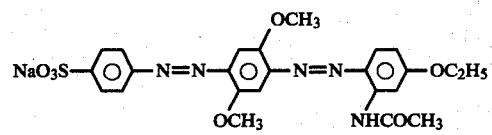

The dyestuff, which gives a red colour when dissolved in hot water, gives even dyeings on wool, silk and synthetic polyamides of brilliant yellowish-red shades which have good light- and wet-fastness. The dyestuff also has good build-up from a neutral bath.

In Table 1, further dyestuffs of the formula

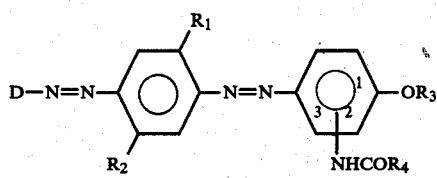

which are obtained in analogy with the procedure described in Example 1 are given. The significances for D, $R_1$, $R_2$, $R_3$ and $R_4$ are indicated in the respective columns, the position of the —$NHCOR_4$ group is indicated in the following column and the dye-shade on polyamide is indicated in column J, wherein a signifies orange, b signifies scarlet red, c signifies yellowish-red, d signifies brownish-red and e signifies yellowish-orange.

excess sodium nitrite is destroyed by adding amidosulphonic acid.

TABLE 1

| Example No. | D | $R_1$ | $R_2$ | $R_3$ | $R_4$ | Position of $NHCOR_4$ group | J |
|---|---|---|---|---|---|---|---|
| 2 | 4-sulphophenyl | $OCH_3$ | $OCH_3$ | $C_2H_5$ | $CH_3$ | 2 | c |
| 3 | " | " | $CH_3$ | " | " | 2 | a |
| 4 | " | " | " | " | " | 3 | a |
| 5 | " | " | $OCH_3$ | $CH_3$ | " | 3 | c |
| 6 | " | " | " | H | $C_2H_5$ | " | 3 | c |
| 7 | " | " | H | H | " | " | 3 | a |
| 8 | " | " | $OCH_3$ | H | H | " | 2 | c |
| 9 | " | " | " | $OCH_3$ | tosyl | " | 3 | b |
| 10 | " | " | " | " | phenyl-sulphonyl | " | 3 | b |
| 11 | " | " | " | " | $C_2H_5$ | $NH_2$ | 3 | b |
| 12 | " | " | $CH_3$ | $CH_3$ | " | $CH_3$ | 3 | a |
| 13 | 3-sulphophenyl | $OCH_3$ | $OCH_3$ | " | " | 3 | c |
| 14 | " | " | " | " | " | 2 | b |
| 15 | " | " | " | $CH_3$ | $CH_3$ | " | 3 | a |
| 16 | " | " | " | $OCH_3$ | " | " | 3 | c |
| 17 | " | " | " | " | $C_2H_5$ | $C_2H_5$ | 3 | c |
| 18 | " | " | " | $CH_3$ | $CH_3$ | $OCH_3$ | 2 | a |
| 19 | " | $CH_3$ | " | H | $CH_3$ | 3 | a |
| 20 | " | H | H | $C_2H_5$ | " | 3 | a |
| 21 | " | $OCH_3$ | $OCH_3$ | " | $NH_2$ | 3 | c |
| 22 | 4-acetylamino-2-sulphophenyl | $OCH_3$ | $OCH_3$ | $C_2H_5$ | $CH_3$ | 3 | d |
| 23 | 4-acetylamino-2-sulphophenyl | " | $CH_3$ | $CH_3$ | " | 3 | b |
| 24 | 5-acetylamino-2-sulphophenyl | " | " | " | " | 3 | a |
| 25 | 2-methyl-4-sulphophenyl | " | " | $C_2H_5$ | " | 3 | b |
| 26 | " | " | " | " | " | 2 | a |
| 27 | " | " | $OCH_3$ | n-$C_4H_9$ | " | 3 | b |
| 28 | 2-methyl-5-sulphophenyl | " | $CH_3$ | $C_2H_5$ | " | 3 | b |
| 29 | " | " | " | $CH_3$ | " | 2 | a |
| 30 | 4-methyl-2-sulphophenyl | " | " | " | " | 2 | a |
| 31 | 2-ethyl-4-sulphophenyl | $CH_3$ | " | " | " | 2 | a |
| 32 | 2,4-dimethyl-6-sulphophenyl | $OCH_3$ | " | " | " | 3 | a |
| 33 | 2,4-dimethyl-6-sulphophenyl | " | " | " | " | 2 | e |
| 34 | 2,4-dimethyl-6-sulphophenyl | " | " | phenyl-sulphonyl | $NH_2$ | 3 | a |
| 35 | 2-methoxy-5-sulphophenyl | " | " | $CH_3$ | $CH_3$ | 3 | b |
| 36 | " | " | " | " | " | 2 | a |
| 37 | " | " | $OCH_3$ | $C_2H_5$ | $OC_2H_5$ | 2 | b |
| 38 | 2-ethoxy-5-sulphophenyl | " | " | $CH_3$ | $CH_3$ | 2 | b |
| 39 | 4-chloro-2-sulphophenyl | $OCH_3$ | $OCH_3$ | $C_2H_5$ | $CH_3$ | 3 | b |
| 40 | " | " | " | " | " | 2 | b |
| 41 | " | $CH_3$ | $CH_3$ | " | $NH_2$ | 3 | a |
| 42 | " | $OCH_3$ | $OCH_3$ | tosyl | $CH_3$ | 3 | b |
| 43 | 2-chloro-5-sulphophenyl | " | " | $C_2H_5$ | " | 3 | b |
| 44 | " | " | " | " | " | 2 | b |
| 45 | " | " | $CH_3$ | $CH_3$ | $OCH_3$ | 2 | a |
| 46 | " | " | " | " | $CH_3$ | 3 | a |
| 47 | 5-chloro-4-methyl-2-sulphophenyl | " | " | " | " | 3 | b |
| 48 | 5-chloro-4-methyl-2-sulphophenyl | " | $OCH_3$ | $C_2H_5$ | " | 3 | c |
| 49 | 2,5-dichloro-4-sulphophenyl | " | $CH_3$ | " | " | 3 | b |
| 50 | 2,5-dichloro-4-sulphophenyl | " | $OCH_3$ | " | " | 3 | b |
| 51 | 3-sulphophenyl | " | " | tosyl | " | 3 | c |
| 52 | 2-methoxy-5-sulphophenyl | " | $CH_3$ | $C_2H_5$ | " | 3 | b |

EXAMPLE 53

27.7 Parts of 4-amino-1,1'-azobenzene-4'-sulphonic acid are dissolved at 60° in 300 parts water at pH 9–10 by addition of a 30% sodium hydroxide solution and are then mixed with 6.9 parts sodium nitrite dissolved in 25 parts water. The nitrite-containing aminoazo dyestuff solution is added dropwise, over a period of 15 minutes, to a reaction vessel containing 35 parts 30% hydrochloric acid, 50 parts water and 150 parts ice, the reaction temperature being 0°–5°. After stirring for 1 hour the excess sodium nitrite is destroyed by adding amidosulphonic acid.

15.4 Parts 1-acetylamino-2-hydroxybenzene are dissolved in 120 parts water and 10 parts 30% sodium hydroxide solution. The diazonium solution obtained as described above is added dropwise thereto over the period of 30 minutes, the pH of the solution being maintained at 10 by the addition of 30% sodium hydroxide solution. After a further 1 hour stirring, the pH is adjusted to 7.5–8.0. The precipitated dyestuff is isolated by filtration and washed with 5% sodium chloride solution.

The obtained filtercake is dissolved at 40° in 600 parts water by adding 10 parts 30% sodium hydroxide solution and is then mixed with 63 parts dimethylsulphate over the period of 30 minutes. During the 30 minutes the pH is maintained at 10.5–11.0 by the dropwise addition of 55 parts 30% sodium hydroxide solution and the temperature is held at 40°, after which the etherification is complete. The precipitated dyestuff which is isolated by filtration followed by washing with 2.5% aqueous sodium chloride solution and drying corresponds to the formula

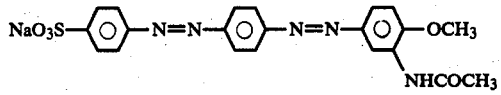

The dyestuff is a red powder which gives an orange colour when dissolved in water and gives dyeings on wool and synthetic polyamides of clear reddish-yellow shades which have good light and wet fastnesses.

In analogy with the procedure described in Example 53 employing the corresponding amount of diethylsulphate instead of 63 parts dimethylsulphate, the dyestuff of the formula

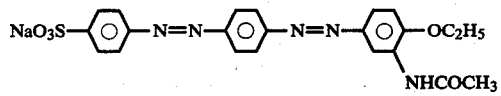

is obtained which gives dyeings on wool and synthetic polyamides of reddish-yellow shades having good light and wet fastnesses.

In Table 2 further dyestuffs of the formula

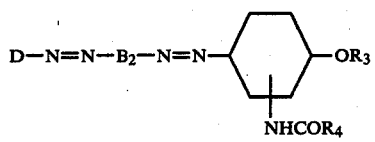

which are obtained in analogy with the procedure described in Example 1, are given. The significances of D, $B_2$, $R_3$ and $R_4$ are given, wherein (Y) as $B_2$ signifies 1,4-naphthylene and (Z) as $B_2$ signifies 5,6,7,8-tetrahydro-1,4-naphthylene. As in Table 1, the dye shade on polyamide is indicated in column J, wherein the letters a to e have the same meanings as given above.

The dyestuffs of Examples 1 and 53 and the dyestuffs of Tables 1 and 2, which are all in the sodium salt form, may, depending on the reaction and isolation conditions, be obtained in free acid form or in other salt forms, for example those salt forms indicated as significances for M in the description hereinbefore.

TABLE 2

| Example No. | D | $B_2$ | $R_3$ | $R_4$ | Position of $NHCOR_4$ group | J |
|---|---|---|---|---|---|---|
| 54 | 4-sulphophenyl | (Y) | $C_2H_5$ | $CH_3$ | 3 | a |
| 55 | " | (X) | $CH_3$ | " | 3 | a |
| 56 | 3-sulphophenyl | (Y) | $C_2H_5$ | " | 3 | a |
| 57 | " | (Y) | " | $NH_2$ | 2 | a |
| 58 | 4-sulphophenyl | (Y) | phenyl sulphonyl | $CH_3$ | 3 | a |
| 59 | 4-acetylamino-2-sulphophenyl | (Y) | $C_2H_5$ | " | 3 | b |
| 60 | 2-chloro-5-sulphophenyl | (Y) | $CH_3$ | $C_2H_5$ | 2 | a |
| 61 | 2-chloro-5-sulphophenyl | (Y) | " | $CH_3$ | 3 | a |
| 62 | 4-sulphophenyl | (Z) | $C_2H_5$ | " | 3 | c |
| 63 | 3-sulphophenyl | (Z) | H | " | 2 | c |

APPLICATION EXAMPLE A

100 Parts of pre-wetted synthetic polyamide, for example nylon 66, are entered at 40° into a dyebath consisting of 4000 parts of water, 10 parts of anhydrous sodium sulphate and 2 parts of the dyestuff from Example 1.

The dye liquor is heated over the course of 30 minutes to boiling temperature and kept at this temperature for 1 hour. 4 Parts of glacial acetic acid are then added thereto and dyeing is completed with heating for a further 30 minutes at boiling temperature. During dyeing, the water that evaporates is continuously replaced. The yellowish-red dyed nylon cloth is then removed from the liquor, rinsed with water and dried. Wool may also be dyed by the same process.

Dyeings may be made in the same manner using the dyestuffs of Examples 2–63 or mixtures of two or more of the dyestuffs of Examples 1 to 63.

The dyeings have notable wet- and light-fastness.

APPLICATION EXAMPLE B

Polyamide is printed with a printing paste containing:
30 parts dyestuff of Example 1
50 parts urea
50 parts solubilizing agent (e.g. thiodiethylene glycol)
290 parts water
500 parts suitable thickening agent (e.g. based on carob bean gum)
20 parts acid donating agent (e.g. ammonium tartrate)
60 parts thiourea The printed textile goods are steamed for 40 minutes at 102° (saturated steam), rinsed cold, subsequently washed at 60° with a dilute solution of a conventional detergent and rinsed again with cold water. A yellowish red print having notable light-and wet-fastness is obtained.

In analogous manner printing pastes may be made employing the dyestuffs of Examples 2–63 or mixtures of two or more of the dyestuffs of Examples 1–63. Such pastes may be employed for printing in accordance with the above given procedure.

What is claimed is:

1. A compound of the formula

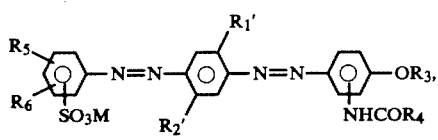

or a mixture of such compounds, wherein
 each of $R_1'$ and $R_2'$ is independently hydrogen, methyl or methoxy,
 $R_3$ is methyl, ethyl, phenylsulfonyl or tosyl,
 $R_4$ is methyl, ethyl, methoxy, ethoxy or amino,
 $R_5$ is hydrogen, chloro, $C_{1-2}$alkyl, $C_{1-2}$alkoxy or acetamido,
 $R_6$ is hydrogen, chloro or methyl, with the proviso that $R_6$ is hydrogen when $R_5$ is acetamido, and
 M is hydrogen or a non-chromophoric cation.

2. A compound according to claim 1, or a mixture of such compounds, wherein
 (i) when $R_5$ is hydrogen and $R_6$ is hydrogen, the —$SO_3M$ group is in the 3- or 4-position,
 (ii) when one of $R_5$ and $R_6$ is hydrogen and the other is other than hydrogen, the two substituents are in the 2,4- or 2,5-positions, and
 (iii) when both $R_5$ and $R_6$ are other than hydrogen, one of $R_5$, $R_6$ and the —$SO_3M$ group is in the 2-position, another is in the 4-position and the third is in the 5- or 6-position.

3. A compound according to claim 1, or a mixture of such compounds, wherein $R_6$ is hydrogen.

4. A compound according to claim 1, or a mixture of such compounds, wherein $R_5$ is hydrogen, chloro, methyl, methoxy or acetamido.

5. A compound according to claim 1, or a mixture of such compounds, wherein $R_3$ is methyl or ethyl, and $R_4$ is methyl, methoxy, ethoxy or amino.

6. A compound according to claim 1, or a mixture of such compounds, wherein $R_4$ is methyl or amino.

7. A compound according to claim 5, or a mixture of such compounds, wherein
 $R_5$ is hydrogen, chloro, methyl, methoxy or acetamido, and
 $R_6$ is hydrogen.

8. A compound according to claim 7, or a mixture of such compounds, wherein $R_4$ is methyl or amino.

9. A compound according to claim 8, or a mixture of such compounds, wherein $R_4$ is methyl.

10. A compound according to claim 7, or a mixture of such compounds, wherein $R_5$ is hydrogen.

11. A compound according to claim 10, or a mixture of such compounds, wherein $R_4$ is methyl.

12. The compound according to claim 11 having the formula

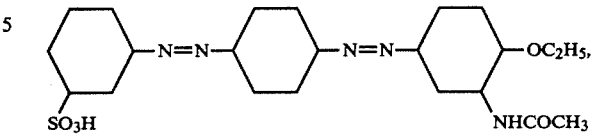

or a salt thereof having a non-chromophoric cation.

13. A compound according to claim 1, or a mixture of such compounds, wherein
 $R_1'$ is methoxy,
 $R_2'$ is methyl or methoxy,
 $R_3$ is methyl or ethyl,
 $R_4$ is methyl, methoxy, ethoxy or amino,
 $R_5$ is hydrogen, chloro, methyl, methoxy or acetamido, and
 $R_6$ is hydrogen, chloro or methyl, with the proviso that $R_6$ is hydrogen when $R_5$ is acetamido, and wherein
 (i) when $R_5$ is hydrogen and $R_6$ is hydrogen, the —$SO_3M$ group is in the 3- or 4-position,
 (ii) when one of $R_5$ and $R_6$ is hydrogen and the other is other than hydrogen, the two substituents are in the 2,4- or 2,5-positions, and
 (iii) when both $R_5$ and $R_6$ are other than hydrogen, one of $R_5$, $R_6$ and the —$SO_3M$ group is in the 2-position, another is in the 4-position and the third is in the 5- or 6-position.

14. A compound according to claim 13, or a mixture of such compounds, wherein $R_4$ is methyl or amino.

15. The compound according to claim 11 having the formula

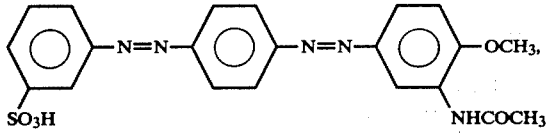

or a salt thereof having a non-chromophoric cation.

16. The compound according to claim 11 having the formula

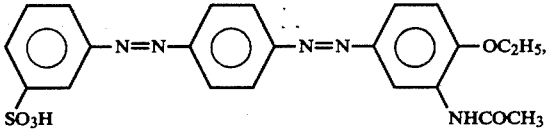

or a salt thereof having a non-chromophoric cation.